United States Patent Office 3,787,407
Patented Jan. 22, 1974

3,787,407
MELAMINE-DERIVATIVES
Udo Hendricks, Cologne, Germany, assignor to Bayer
Aktiengesellschaft, Leverkusen, Germany
No Drawing. Filed Aug. 27, 1971, Ser. No. 175,720
Claims priority, application Germany, Aug. 28, 1970,
P 20 42 661.3
Int. Cl. C07d 55/24
U.S. Cl. 260—249.6          4 Claims

ABSTRACT OF THE DISCLOSURE

New melamine derivatives of the general formula

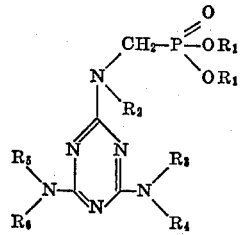

in which the radicals $R_1$, independently of one another, mean a lower alkyl radical; and $R_2$, $R_3$, $R_4$, $R_5$ and $R_6$, independently of one another, mean a hydrogen atom, a hydroxymethyl group or a radical of the formula

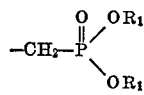

a process for their production and their use as flameproofing agents for textile materials.

---

The invention relates to melamine derivatives; more particularly it concerns new melamine derivatives of the general formula

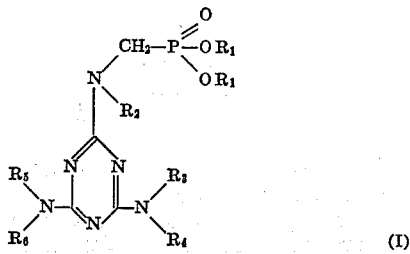

in which the radicals $R_1$, independently of one another, mean a lower alkyl radical; and $R_2$, $R_3$, $R_4$, $R_5$ and $R_6$, independently of one another, mean a hydrogen atom, a hydroxymethyl group or a radical of the formula

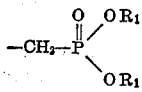

furthermore to a process for their production and to their use as flameproofing agents for textile materials. The new melamine derivatives are obtained by reacting N-hydroxymethyl-melamines of the general formula

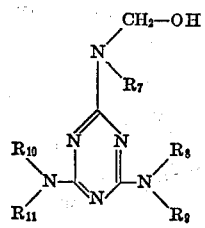

in which $R_7$, $R_8$, $R_9$, $R_{10}$ and $R_{11}$, independently of one another, stand for a hydrogen or a hydroxymethyl radical, with phosphorous acid trialkyl esters of the formula

in which $R_1$ has the same meaning as above, optionally in the presence of a basic catalyst and/or an inert diluent, preferably at temperatures of about 40 to 140° C.

Suitable phosphorous acid triaialkyl esters are, for example, trimethyl phosphite, triethyl phosphite, dimethylethyl phosphite, triisopropyl phosphite, tri-n-propyl phosphite, dimethyl-n-propyl phosphite, tri-n-butyl phosphite and triisobutyl phosphite.

Those compounds of the General Formula I in which at least one of the radicals $R_2$ to $R_6$ stands for a hydroxymethyl group are particularly preferred.

Suitable N-hydroxymethyl-melamines of the Formula II are, for example, dimethylol-, trimethylol-, tetramethylol- and hexamethylol-melamine.

To carry out the process for the production of the Compounds I, the starting compounds of the Formula II are mixed with the phosphorous acid trialkyl esters of the Formula III and the mixture is caused to react at a temperature of about 40 to about 140° C., preferably at about 90 to 120° C. The alkanol of the general formula $R_1$—OH formed in the course of the reaction is expediently removed from the reaction mixture in a continuous operation, for example, by distillation or with the aid of an inert gas current.

The molar ratio between the reaction partners is chosen in such a manner that one molecule of the phosphorous acid trialkyl ester of the Formula III is present for every N-hydroxymethyl group of the compounds of the Formula II which is to be reacted; the phosphorous acid trialkyl esters may also be used in a slight excess. If several hydroxymethyl groups are present, it is not necessary to react all the hydroxymethyl groups in the compounds of the Formula II with phosphorous acid trialkyl esters of the Formula III. Incomplete conversion leads to the formation of compounds of the Formula I which still contain free N-hydroxymethyl groups and are particularly preferred. The reaction can be catalyzed by the addition of basic compounds, for example, triethylamine or tri-n-butylamine. An addition of inert diluents, such as methanol, ethanol, dioxan or dimethyl formamide is also possible.

The compounds of the Formula I are suitable as flameproofing agents for textile materials consisting, for example, of natural or regenerated cellulose, polyesters, natural and synthetic polyamides or polyacrylonitrile, and other materials, e.g. paper and plastics. The compounds of the Formula I which still contain N-hydroxymethyl groups are condensed at an elevated temperature, especially in the presence of acidic compounds, to form water-insoluble incombustible resins.

In order to increase the resistance to washing of the flameproofing finish obtained with the melamine derivatives according to the invention, it has proved advantageous to use the melamine derivatives according to the invention together with aminoplasts, such as formaldehyde-urea resins, e.g. N-methylol-ureas; formaldehyde-melamine resins, such as N-methylol-melamines; and etherified formaldehyde-urea or formaldehyde-melamine resins; and with acidic catalysts, e.g. ammonium chloride or zinc chloride. For example, the fabric to be finished is impregnated with an aqueous liquor containing about 20 to 40% by weight, referred to the weight of the fabric, of melamine derivatives according to the invention; about 5 to 10% by weight, referred to the weight of the fabric, of aminoplasts; and an acidic catalyst. After drying, the fabric is subjected for a few minutes to a heat treatment at 130° to 200° C., preferably at 150 to 180° C.

The parts given in the following examples are parts by weight.

EXAMPLE 1

200 parts (0.653 mol) of hexamethylol-melamine which had been freshly prepared and dried were mixed with 433 parts (2.61 mol) triethyl phosphite and the mixture was heated to 100 to 110° C. with vigorous stirring. Ethanol begins to distil over in the exothermic reaction; the temperature is slowly raised to 120 to 130° C. whereupon the hexamethylol-melamine slowly dissolves. The elimination of ethanol is completed after about 1½ hours. The residual ethanol and unreacted triethyl phosphite are removed by a short heating at 110 to 120° C. under reduced pressure. There are obtained 493 g. of a viscous clear liquid which gives an almost clear solution in water.

Analysis.—Calcd. for $C_{25}H_{54}N_6O_{14}P_4$ (786) (percent): P, 15.78; N, 10.68. Found (percent): P, 15.4; N, 10.3.

EXAMPLE 2

44 parts (0.2 mol) trimethylol-melamine were heated with 111 parts (0.66 mol) triethyl phosphite with vigorous stirring at 90 to 100° C. until an exothermic reaction occurred. When the distilling off of the ethanol was completed, heating was continued at 110 to 120° C. for 30 minutes. After briefly heating under reduced pressure at 80–90° C., 120 g. of a viscous colorless substance were obtained.

Analysis.—Calcd. for $C_{18}H_{39}N_6O_9P_3$ (576) (percent): P, 16.13; N, 14.56. Found (percent): P, 17.10; N, 13.98.

EXAMPLE 3

31 parts (0.1 mol) hexamethylol-melamine were reacted with 83 parts (0.5 mol) triethyl phosphite in the manner described in Example 1. There were obtained 87 parts of a clear viscous liquid which gave an almost clear solution in water.

Analysis.—Calcd. for $C_{29}H_{63}N_6O_{19}P_5$ (906) (percent): N, 9.27; P, 17.10. Found (percent): N, 9.14; P, 16.5.

EXAMPLE 4

31 parts (0.1 mol) hexamethylol-melamine were heated with 49 parts (0.4 mol) trimethyl phosphite to 90 to 110° C. The elimination of methanol was completed and the hexamethylol-melamine had dissolved after about 50 minutes. The viscous residue was heated under reduced pressure at 40 to 50° C. for 30 minutes. 66 parts of a viscous liquid were obtained. This has the property of being condensed to an insoluble incombustible mass when heated to 140 to 150° C.

Analysis.—Calcd. for $C_{17}H_{38}N_6O_{14}P_4$ (674) (percent): N, 12.47; P, 18.40. Found (percent): N, 11.65; P, 17.7.

EXAMPLE 5

Cotton flannel is impregnated on a foulard with one of the solutions A, B, C or D described below, and squeezed to a liquor absorption of 95%. The fabric is dried at 90 to 100° C. for 10 minutes and condensed at 165° C. for 5 to 6 minutes. The fabric is subsequently briefly washed hot and dried again.

In order to test the flame-inhibiting effect, the pieces of fabric were subjected to the test according to DIN 53906 (vertical test):

| | Fabric treated with solution— | | | |
|---|---|---|---|---|
| | A | B | C | D |
| Burning time (sec.) | | | | 34 |
| Glimmering time (sec.) | | | | 10 |
| Length of burn (cm.) | 8.5 | 10.6 | 13.6 | (¹) |

¹ Burnt out.

After the fabric had been subjected five times to a wash in a washing machine at 60° C. with a conventional detergent, the following values were obtained in the same test:

| | Fabric treated with solution— | | | |
|---|---|---|---|---|
| | A | B | C | D |
| Burning time (sec.) | 2 | | 35 | 31 |
| Glimmering time (sec.) | | | | 81 |
| Length of burn (cm.) | 9.6 | 8.8 | (¹) | (¹) |

¹ Burnt out.

The solutions A, B, C and D used above contained, per litre:

Solution A 280 g. of the melamine derivative described in Example 1
4 g. ammonium chloride
200 g. of a 55% aqueous solution of the trimethyl ether of trimethylol-melamine;

Solution B 400 g. of the melamine derivative described in Example 2
4 g. ammonium chloride
200 g. of a 55% aqueous solution of the trimethyl ether of trimethylol-melamine;

Solution C 280 g. of the melamine derivative described in Example 1;

Solution D 4 g. ammonium chloride
200 g. of a 55% aqueous solution of the trimethyl ether of trimethylol-melamine.

What is claimed is:

1. Melamine derivative of the formula

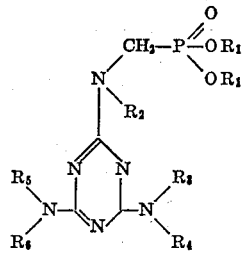

in which the radicals $R_1$, independently of one another, mean a lower alkyl radical; and $R_2$, $R_3$, $R_4$, $R_5$ and $R_6$, independently of one another, mean a hydrogen atom, a hydroxymethyl group or a radical of the formula

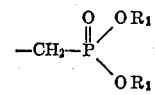

2. Melamine derivative according to claim 1, characterized in that at least one of the radicals $R_2$, $R_3$, $R_4$, $R_5$ or $R_6$ is a hydroxymethyl group.

3. Process for the production of melamine derivative of the formula

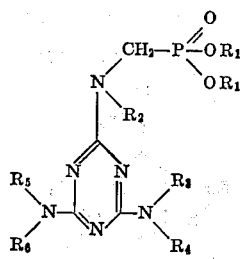

in which the radicals $R_1$, independently of one another, mean a lower alkyl radical; and $R_2$, $R_3$, $R_4$, $R_5$ and $R_6$, independently of one another, mean a hydrogen atom, a hydroxymethyl group or a radical of the formula

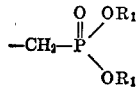

characterized in that N-hydroxymethyl-melamines of the formula

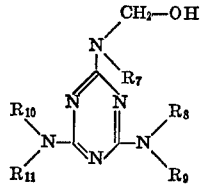

in which the radicals $R_7$, $R_8$, $R_9$, $R_{10}$ and $R_{11}$ stand for hydrogen atoms or hydroxymethyl radicals, are reacted with phosphorous acid trialkyl esters of the formula

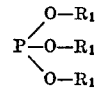

in which the radicals $R_1$ have the same meaning as above, optionally in the presence of a basic catalyst or an inert diluent, preferably at temperatures of about 40 to 140° C.

4. Process according to claim 3, characterized in that N-hydroxymethyl-melamine of the formula of claim 3 is reacted with phosphorous acid trialkyl ester of the formula of claim 3 in such a molar ratio that free N-hydroxymethyl is still present after the reaction.

References Cited

UNITED STATES PATENTS 3,551,422  12/1970  Tesoro et al. _____ 260—249.6

JOHN M. FORD, Primary Examiner

U.S. Cl. X.R.

252—8.1, 8.8; 117—136; 106—15 FP